UNITED STATES PATENT OFFICE.

JAMES BOYCE, OF CHICAGO, ILLINOIS, ASSIGNOR TO AMERICAN COTTON OIL COMPANY, OF NEW YORK, N. Y., A CORPORATION OF NEW JERSEY.

PROCESS OF PRODUCING AN EDIBLE COMPOUND.

1,061,254. Specification of Letters Patent. Patented May 6, 1913.

No Drawing. Application filed February 25, 1911. Serial No. 610,721.

*To all whom it may concern:*

Be it known that I, JAMES BOYCE, a citizen of the United States, residing at Chicago, county of Cook, and State of Illinois, have invented certain new and useful Improvements in Processes of Producing an Edible Compound, which is set forth in the following specification.

My invention relates to a process of producing an edible compound and the compound thus produced, together with one process of producing it, are described and claimed in a separate application for patent filed February 25, 1911, Serial No. 610,922. The present process is an alternative to the one so described and claimed.

My new compound consists, in brief, of a mixture of a refined edible oil with a hardening material consisting of a synthetic stearin, produced by the action of hydrogen in the presence of a catalytic upon a previously unsaturated oil or fat.

My present process consists in producing the aforesaid mixture by subjecting the body of refined, unsaturated oil itself to the catalytic action of hydrogen, such action however being only carried to a degree sufficient to convert the required fraction of the oil into the synthetic stearin, the hydrogenizing process being arrested at a point when the said stearin will be of an amount equal to about twenty per cent. of the entire body of oil and stearin. By arresting the action at this point there will remain a mixture of the refined, unsaturated oil and the synthetic stearin produced by the hydrogenizing of a portion of the original body of oil. This mixture will be of the consistency of lard and will be edible. The hydrogenizing process above referred to is well known and need not be described in detail. By this means I produce at small cost a highly useful form of food.

What I claim as new and desire to secure by Letters Patent is:

The method of producing an edible compound, which consists in first refining an unsaturated oil or fat to an edible condition, and then mixing the same with a synthetic stearin by subjecting it to the action of hydrogen in the presence of a catalytic and arresting such action at the point when the desired amount of said synthetic stearin has been produced by the saturation with hydrogen of a portion of the said oil or fat, the resulting product being a mixture of a portion of the original body of oil or fat and the synthetic stearin having a consistency of lard.

In witness whereof I have hereunto set my hand, before two subscribing witnesses, this 15th day of February, 1911.

JAMES BOYCE.

Witnesses:
E. M. BENTLEY,
JNO. F. LAYER.